United States Patent
Park (10) Patent No.: US 7,606,600 B2
(45) Date of Patent: Oct. 20, 2009

(54) METHOD OF CONNECTING A MOBILE TERMINAL INCLUDING A BLUETOOTH MODULE AND A BLUETOOTH ACCESS POINT

(75) Inventor: Joung-Kyou Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1034 days.

(21) Appl. No.: 10/858,302

(22) Filed: Jun. 1, 2004

(65) Prior Publication Data
US 2005/0054291 A1 Mar. 10, 2005

(30) Foreign Application Priority Data
Sep. 9, 2003 (KR) .................. 10-2003-0063096

(51) Int. Cl.
*H04M 1/00* (2006.01)
*H04B 1/38* (2006.01)
(52) U.S. Cl. .............. 455/574; 455/435.1; 455/435.2; 455/435.3; 455/41.2; 455/552.1; 455/553.1; 455/74; 455/74.1
(58) Field of Classification Search ... 455/435.1–435.3, 455/426.1–426.2, 41.1–41.2, 74, 74.1, 552.1, 455/553.1, 554.1–554.2, 555, 574
See application file for complete search history.

(56) References Cited

U.S. PATENT DOCUMENTS

| 7,200,112 | B2 * | 4/2007 | Sundar et al. ............... 370/230 |
| 2002/0187780 | A1 * | 12/2002 | Souissi ...................... 455/426 |
| 2003/0051052 | A1 * | 3/2003 | Shteyn et al. ............... 709/245 |
| 2003/0134650 | A1 | 7/2003 | Sundar et al. |
| 2003/0194090 | A1 * | 10/2003 | Tachikawa .................. 380/270 |
| 2004/0093398 | A1 * | 5/2004 | Tang et al. .................. 709/220 |

FOREIGN PATENT DOCUMENTS

| WO | WO 02/069570 | 9/2002 |
| WO | WO 02/093955 | 11/2002 |

* cited by examiner

*Primary Examiner*—Tuan A Tran
(74) *Attorney, Agent, or Firm*—The Farrell Law Firm, LLP (57) ABSTRACT

A method of connecting a mobile terminal and an AP. The mobile terminal has a short-distance wireless communication module and a mobile communication module, and the AP provides a wired/wireless communication interface. The SID and NID of a network with the AP are stored as SID_Bond and NID_Bond at an initial bonding with the AP. It is determined whether a channel established with the AP has been terminated. If the channel is terminated, the SID_Bond and NID_Bond are compared with an SID and NID for the present position. If they are different, the short-distance wireless communication module is transitioned to a low-power mode.

9 Claims, 5 Drawing Sheets

METHOD OF CONNECTING A MOBILE TERMINAL INCLUDING A BLUETOOTH MODULE AND A BLUETOOTH ACCESS POINT

PRIORITY

This application claims priority under 35 U.S.C. § 119 to an application entitled "Method of Connecting Communication Between Mobile Terminal Having Bluetooth Module and Bluetooth Access Point" filed in the Korean Intellectual Property Office on Sep. 9, 2003 and assigned Serial No. 2003-63096, the contents of which are incorporated herein by reference.

BACKGROUND OF THE INVENTION

1. Field of the Invention

The present invention relates generally to a mobile terminal enabled with a Bluetooth function, and in particular, to a method of connecting a mobile terminal enabled with a Bluetooth function and a Bluetooth access point (AP) that provides a wired/wireless communication interface by controlling a short-distance communication connection of the mobile terminal.

2. Description of the Related Art

Bluetooth is a short-distance wireless communication technology of wirelessly transmitting information such as text, voice, and/or video data within a range of 10 to 100 m at up to 1 Mbps.

A Bluetooth-enabled device (hereinafter, referred to as a Bluetooth device) enters a connect state for communication with other Bluetooth devices through the states of inquiry, inquiry scan, page, and page scan. In this process, the Bluetooth devices are designated as a master and slaves according to their roles.

To establish a new connection between Bluetooth devices within the range of each other, the devices must coincide in operation clock and frequency pattern. In the inquiry state, a master repeatedly transmits signals at an operation frequency to let slaves synchronize to the frequency pattern. In the inquiry scan process, the slaves detect the operation frequency and synchronize to it. In the page state, the master transmits a clock signal that enables the slaves to synchronize to the operation clock of the master. The slaves detect the clock signal and synchronize to it in the page scan state. A network consisting of a master and one or more slaves connected to the master through the procedure is called "piconet".

In accordance with the existing proposed Bluetooth technology, a Bluetooth piconet consists of one master and seven active slaves. To introduce a new slave into the piconet, the master releases one of the slaves from the active state and connects a communication to the new active slave, instead.

Operation modes between the master and the slaves are an active mode for normal communication between the master and the slaves and a hold/sniff/park mode being a low power consumption mode in the Bluetooth communication. The hold mode is a typical mode set when no data needs to be transmitted for a relatively long time. In the sniff mode, data is exchanged between the master and a slave during a preset time period. The park mode is a mode in which the master and the slave intermittently communicate with each other for the slave to maintain synchronization and request transitioning to the active state.

In any of the active, sniff, and park modes, the slave periodically performs an operation corresponding to the mode. Although the hold mode is not periodical, a hold mode operation can be considered as periodic like operations in the other modes because the slave is to wake up (is activated) at a predetermined time and communicate with the master.

When a slave connected to the master is transitioned to a particular mode, the master assigns communication times to all the slaves by negotiations with them. The slaves are configured to operate periodically in their modes by negotiations with the master. The slaves communicate with the master at the negotiated times and for the negotiated periods until their modes are changed.

An existing wireless telephone system charges a mobile terminal, such as a PCS (Personal Communications Services) or cellular phone, a higher rate than a wired telephone system. To overcome this shortcoming, a method of using the wired telephone system through a mobile terminal equipped with a Bluetooth module being a short-distance wireless communication module has been proposed. This method can be implemented via an AP that enables a data exchange between a wired network and a wireless network.

Hence, a Bluetooth standardization group has proposed standards by which a single mobile terminal can provide three different functionalities. That is, a Bluetooth-enabled mobile terminal acts as an intercom handset if it is connected to an intercom in an office, as a wireless telephone handset in a household when it is connected to a base station for a wireless telephone, and as a mobile phone when it moves.

Figure 1:
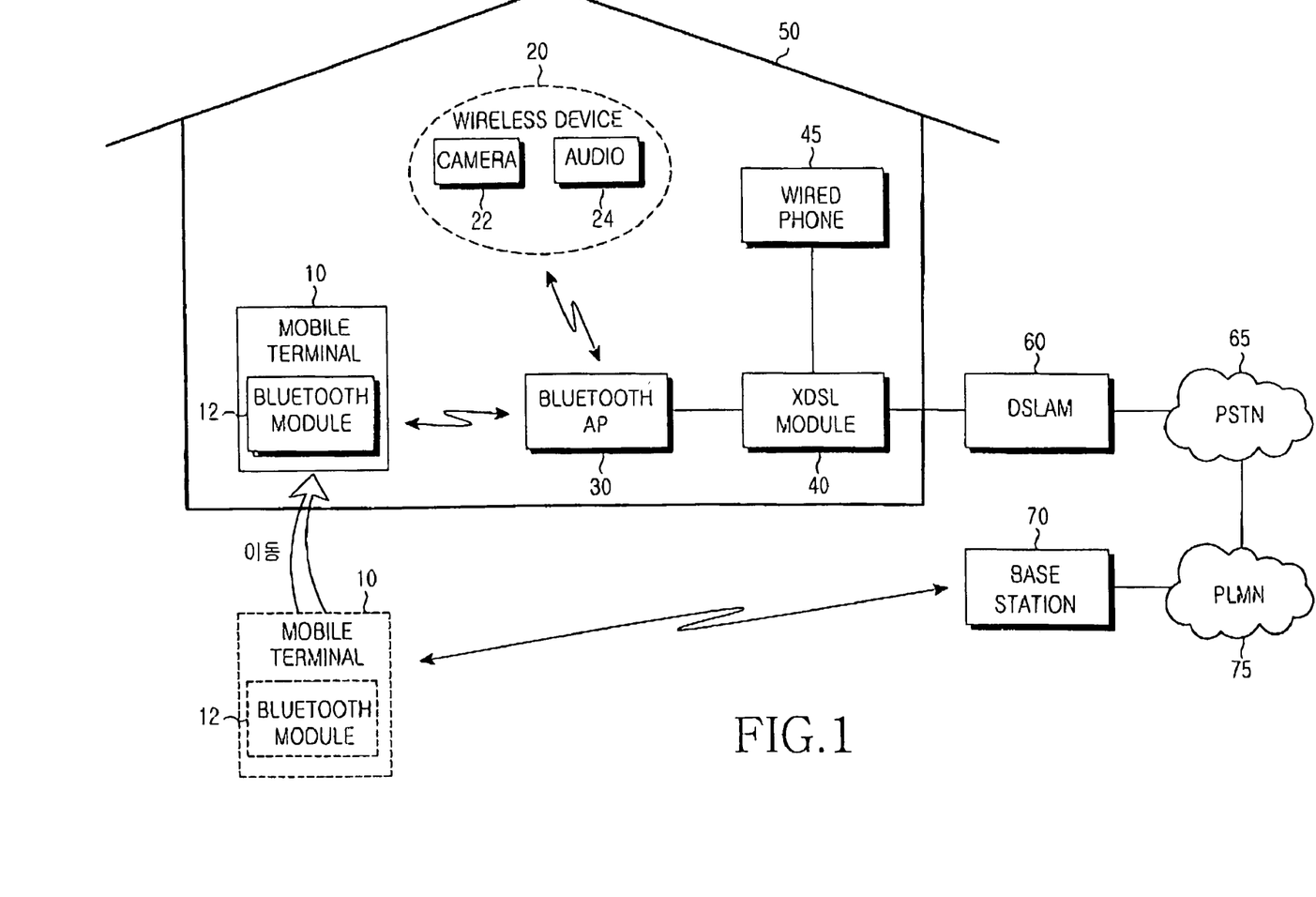
FIG. 1 illustrates an exemplary use of a Bluetooth-enabled mobile terminal as a wireless phone within a household.

FIG. 1 illustrates an exemplary use of a mobile terminal having a Bluetooth module built therein as a short-distance wireless communication module in a household. Referring to FIG. 1, a mobile terminal 10 including a Bluetooth module 12 built therein functions as a typical mobile phone outside a household 50. That is, the mobile terminal 10 receives a mobile telephony service from a PLMN (Public Land Mobile Network) 75 via a base station 70.

Within the household 50, however, the mobile terminal 10 functions as a wireless phone through connection to a Bluetooth AP 30 connected to an XDSL module 40 (xDSL is a generic abbreviation for the many flavors of DSL or Digital Subscriber Line technology). The Bluetooth AP 30 further wirelessly transmits and receives data to and from a Bluetooth-enabled wireless device 20, such as a camera 22 and an audio device 24, in the household 50.

The XDSL module 40, connected to a wired phone 45, allows a call to be conducted through the wired phone 45 when the mobile terminal 10 is outside the household 50. The XDSL 40 is connected to a DSLAM (Digital Subscriber Line Access Multiplexer) 60, which is in turn connected to a PSTN (Public Switched Telephone Network) 65.

To function as a wireless phone within the household 50, the Bluetooth-enabled mobile terminal 10 must establish a connection with another Bluetooth module through the inquiry, inquiry scan, page, and page scan states. Here, minimization of current consumption is the most important if the mobile terminal 10 is used for wireless communication.

In this context, methods of designing a Bluetooth-enabled mobile terminal with a minimal current consumption in a connect state have been studied. A typical current consumption method as defined in the Bluetooth specifications is to transition the mobile terminal to a park mode or a sniff mode.

Within the household 50, the mobile terminal 10 automatically attempts to connect to the Bluetooth AP 30 without user manipulation. Because the mobile terminal 10 is kept connected to the Bluetooth AP 30, tens of milliamperes of current are continuously consumed with no communication connected. Therefore, the mobile terminal 10 is automatically connected to the Bluetooth AP 30 even in an idle state when no communications are being conducted. The resulting continuous current consumption drastically reduces charged current in the mobile terminal 10.

What is worse, the conventional Bluetooth-enabled mobile terminal continuously attempts to connect to the Bluetooth AP irrespective of a place where a user wants to use the mobile terminal as a wireless phone, thereby resulting in further unnecessary current dissipation.

SUMMARY OF THE INVENTION

An object of the present invention is, therefore, to provide a method of automatically connecting a mobile terminal including a short-distance wireless communication module and an AP that provides a wired/wireless communication interface, thereby minimizing the current consumption of the mobile terminal.

Another object of the present invention is to provide a method of automatically connecting a mobile terminal having a short-distance wireless communication module and an AP that provides a wired/wireless communication interface in a user-selected area for using the mobile terminal for short-distance wireless communication, thereby minimizing the current consumption of the mobile terminal.

The above and other objects are achieved by a method of connecting a mobile terminal and an AP. The mobile terminal has a short-distance wireless communication module and a mobile communication module, and the AP provides a wired/wireless communication interface. In the present method, the SID and NID of a network with the AP are stored as SID_Bond and NID_Bond at an initial bonding with the AP. It is determined whether a channel established with the AP has been terminated. If the channel is terminated, the SID_Bond and NID_Bond are compared with an SID and NID for the present position. If they are different, the short-distance wireless communication module is transitioned to a low-power mode.

It is preferred that if SID_Bond and NID_Bond are different from the present SID and NID, the short-distance wireless communication module is transitioned to a power-off mode.

Further, if SID_Bond and NID_Bond are equal to the present SID and NID, the short-distance wireless communication module attempts a connection to the AP.

When the short-distance wireless communication module is in the low-power or power-off mode, the mobile communication module detects an SID and NID for the present position and compares SID_Bond and NID_Bond with the present SID and NID. If SID_Bond and NID_Bond are equal to the present SID and NID, the short-distance wireless communication module is reconnected to the AP through an attempt of a connection to the AP.

If SID_Bond and NID_Bond are different from the present SID and NID, the short-distance wireless communication module is maintained in the low-power or power-off mode.

The short-distance wireless communication module communicates with the AP on the channel, if the short-distance wireless communication module is not disconnected to the AP or is reconnected to the AP.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

In accordance with the present invention, an SID (System ID) and NID (Network ID) at an initial bonding are stored for use in locating a mobile terminal. The stored SID and NID are compared with an SID and NID received at the present position. According to the comparison result, an AP communication available area is detected and it is determined whether the mobile terminal can communicate with an AP. Beyond the AP communication available area, a short-distance wireless communication module in the mobile terminal is transitioned to a low-power mode or a power-off mode, thereby minimizing current consumption. In addition, a connection to the AP is attempted only when the stored SID and NID are equal to the present SID and NID. If they are different, modules related with short-distance wireless communication including the short-distance wireless communication module are transitioned to the low-power mode or power-off mode. Therefore, power consumption is minimized, still conducting a necessary communication with the AP. Here, power can be blocked from a Bluetooth module by use of a switch.

SID and NID are used as primary information to identify each cell in a CDMA (Code Division Multiple Access) cellular system in the present invention. In fact, cellular systems provide various cell identifying means and their designations are system-dependent. That is, cell IDs with different designations but similar functions are used in GSM (Global System for Mobile communication), AMPS (Advanced Mobile Phone Service), and TDMA (Time Division Multiple Access) systems. Aside from SID and NID, there are cell IDs that can be extracted from a searcher. Therefore, novel parameters produced by combining or modifying these parameters can also be used in the same sense of SID and NID, or cell ID in the present invention.

Figure 2:
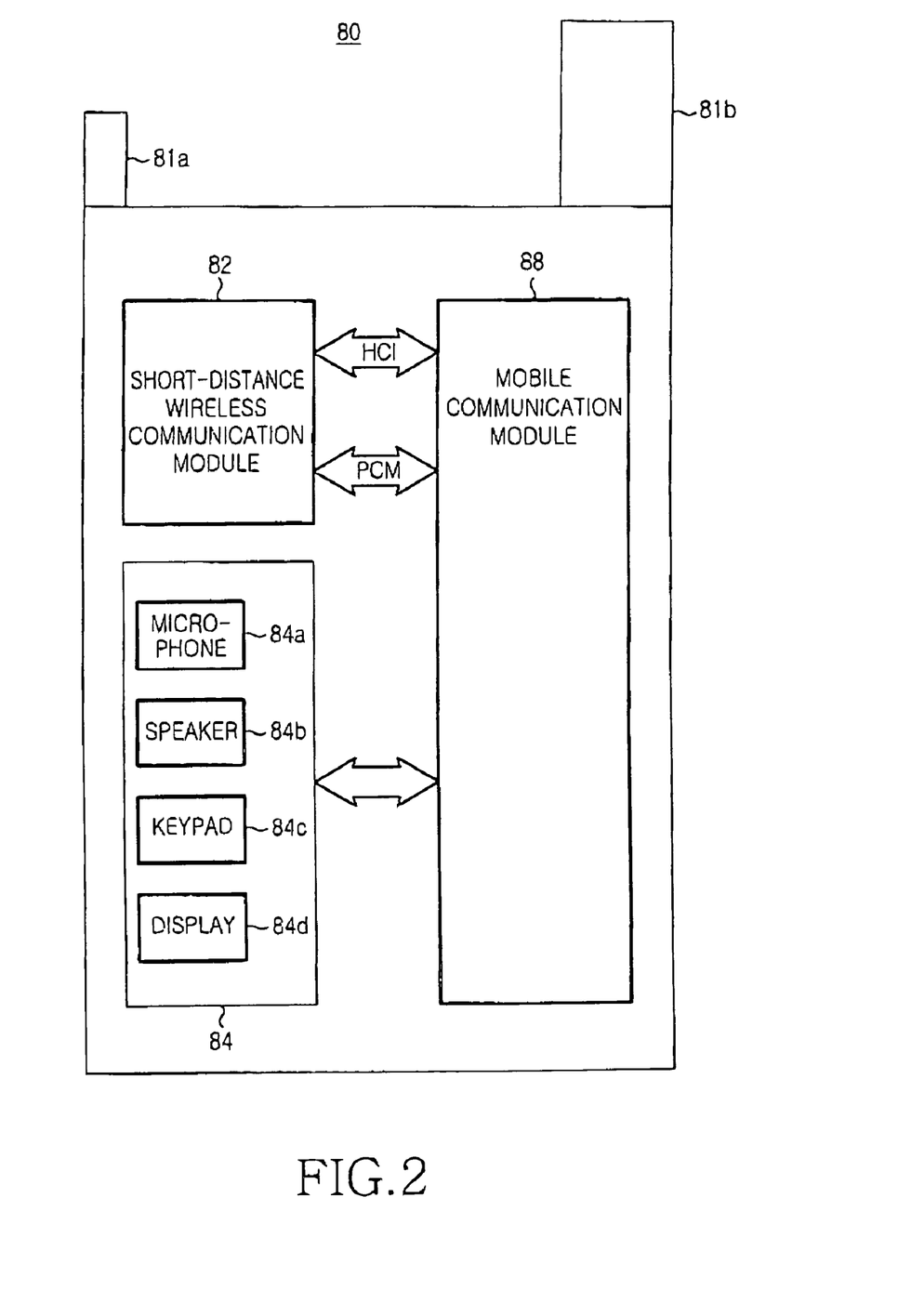
FIG. 2 is a block diagram of a mobile terminal capable of functioning as both a mobile phone and a wireless phone.

FIG. 2 is a schematic block diagram of a mobile terminal capable of functioning as a mobile phone and a wireless phone. Referring to FIG. 2, the mobile terminal 80 comprises a short-distance wireless communication module 82, a common unit 84 including a microphone 84a, a speaker 84b, a keypad 84c, and a display 84d, and a mobile communication module 88.

The short-distance wireless communication module 82 enables the mobile terminal 80 to communicate with an AP that provides a wired/wireless communication interface. In an embodiment of the present invention, a Bluetooth module is taken as an example of the short-distance wireless communication module 82. Therefore, the mobile terminal 80 is equipped with a Bluetooth antenna 81a for transmitting/receiving data when it functions as a wireless phone (or an intercom).

The mobile communication module 88, when the main function of the mobile terminal 80 (i.e. mobile communication) is performed, is connected to a base station and the PLMN and provides a mobile telephony service. Hence, the mobile terminal 80 is provided with a mobile communication antenna 81b for transmitting/receiving data for mobile communication.

As defined in the Bluetooth specifications, the short-distance wireless communication module 82 and the mobile communication module 88 transmit/receive commands and data via an HCI (Human-Computer) interface and audio data via a PCM (Pulse Code Modualtion) interface.

The common unit 84 is commonly used when the mobile terminal 80 functions as a wireless phone (intercom) or a mobile phone.

In accordance with the present invention, the mobile communication module 88 stores an SID and an NID received through the mobile communication antenna 81b, while the short-distance wireless communication module 82 initially registers to the AP through the Bluetooth antenna 81a. These SID and NID are called SID_Bond and NID_Bond, respectively.

SID is a system or provider ID. It identifies the service network of a particular mobile communication provider. NID is a network ID identifying a specific network in the mobile communication system. SID and NID are network-specific. The mobile communication module 88 continuously receives SIDs and NIDs through the mobile communication network 81b.

Upon wireless connecting to the AP through the short-distance wireless communication module 82, the mobile terminal 80 communicates with the AP on an established channel. If the mobile terminal 80 is disconnected from the AP during the ongoing communication, the mobile communication module 88 compares the SID_Bond and the NID_Bond stored at the bonding with the present received SID and NID. If they are the same, the short-distance communication module 82 attempts to connect to the AP.

However, if the SID_Bond and the NID_Bond are different from the present SID and NID, the short-distance wireless communication module 82 transitions to a power saving mode, that is, a low-power mode. The power saving mode (or low-power mode) is not a park/sniff mode. It indicates power-off or disabling of the Bluetooth function blocks.

In this case, the short-distance wireless communication module 82 can be powered-off. With the short-distance wireless communication module 82 in the low-power mode, the mobile communication module 88 continuously compares the SID_Bond and the NID_Bond with the present SID and NID. When they are the same, the short-distance wireless communication module 82 terminates the low-power mode and attempts a connection to the AP.

Because the SID_Bond and the NID_Bond are stored at the initial bonding for use in positioning the mobile terminal 80 and an AP communication available area is determined by comparing the SID_Bond and the NID_Bond with an SID and an NID received at the present position, the short-distance wireless communication module 82 is placed in the low-power mode, or powered-off beyond the AP communication available area, thereby minimizing current consumption.

Moreover, a connection to the AP is attempted only when the SID_Bond and the NID_Bond are equal to the present SID and NID. Otherwise, the short-distance wireless communication module 82 and its related modules are transitioned to the low-power mode or powered-off. As a result, power consumption is minimized and a communication connection is automatically made between the mobile terminal 80 and the AP.

Figure 3:
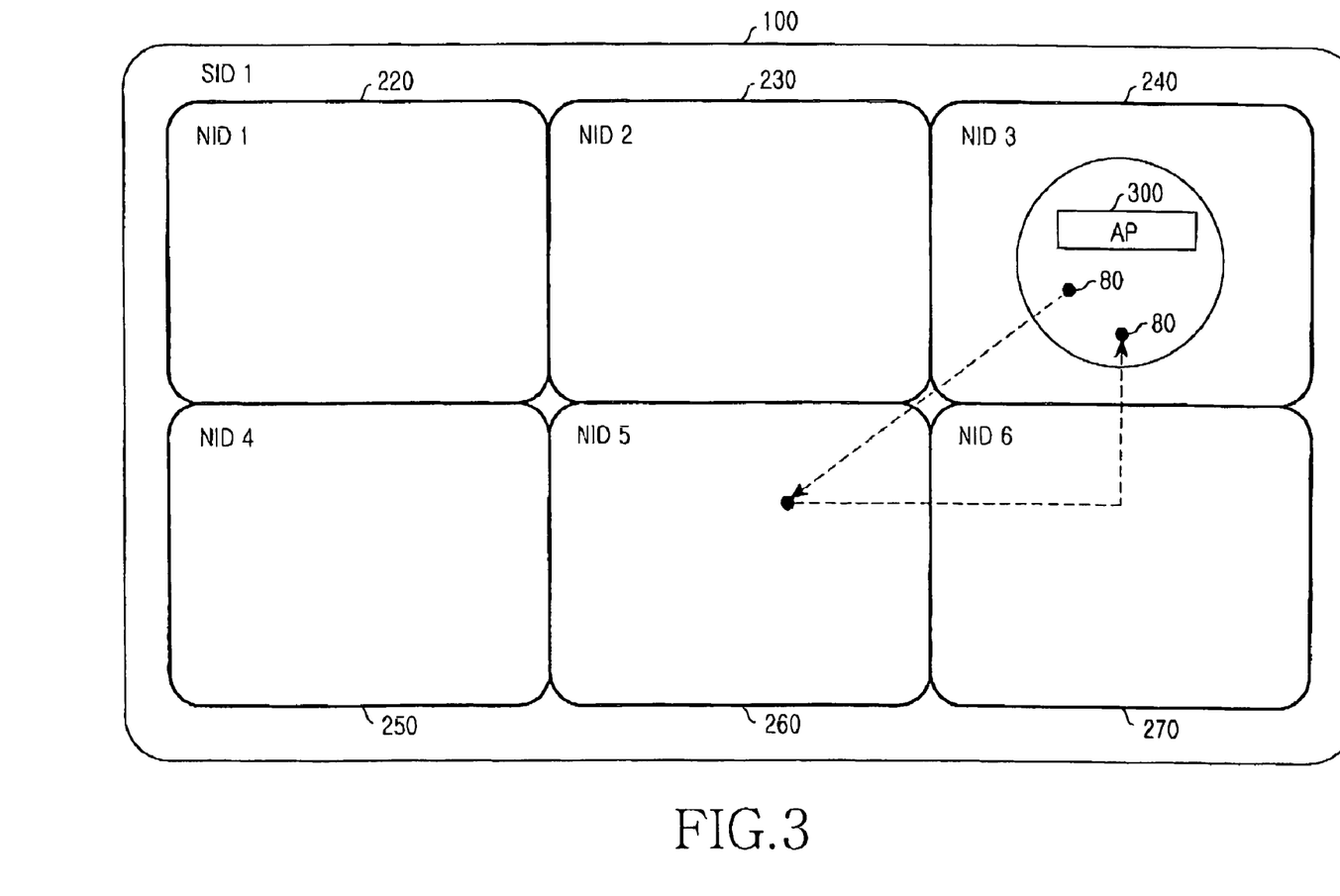
FIG. 3 illustrates the configuration of a typical mobile communication network.

FIG. 3 illustrates the configuration of a typical mobile communication network. Referring to FIG. 3, the mobile communication network includes a system network 100 having an SID and networks 220 to 270 with different NIDs under the system network 100. As the mobile terminal 80 roams to a different network, it receives a different NID. If SID_Bond and NID_Bond stored in the mobile terminal 80 are SID 1 and NID 3, respectively, the mobile terminal 80 communicates with an AP 300 in the network 240 having SID 1 and NID 3, and transitions short-distance wireless communication-related modules to a low-power mode or a power-off mode outside the network 240.

In FIG. 3, a dotted line denotes a movement path of the mobile terminal 80. The mobile terminal 80 initially sets the SID_Bond and the NID_Bond to SID 1 and NID 3 of the network 240 with which the mobile terminal 80 is bonded.

As the mobile terminal 80 moves out of the network 240 and is disconnected from the AP 300, it transitions the short-distance wireless communication-related modules to the low-power mode or power-off mode without attempting a connection to the AP 300. The mobile terminal 80 is shown to move from the network 240 with SID 1 and NID 3, pass through the network 260 with SID 1 and NID 5 and the network 270 with SID 1 and NID 6, and return to the network 240 with SID 1 and NID 3.

If the mobile terminal 80 in the low-power or power-off mode moves to the network 240 with the same SID and NID as stored as the SID_Bond and the NID_Bond, it attempts a communication connection to the AP 300.

Only when the SID_Bond and the NID_Bond match an SID and an NID received at the present position, is the mobile terminal connected to the AP 300. Otherwise, the mobile terminal is maintained in the low-power mode or power-off mode. Thus, the current consumption of the mobile terminal 80 is minimized, maintaining a necessary communication with the AP 300.

Figure 4A:
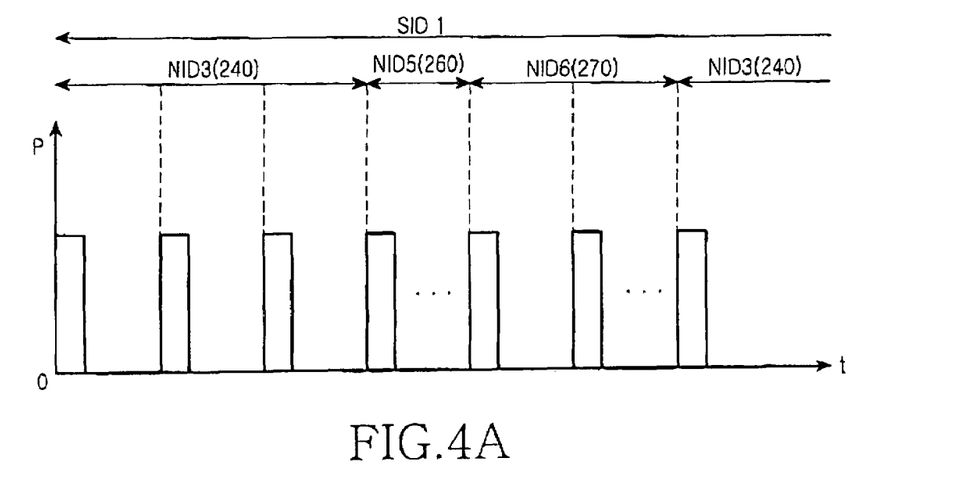
FIGS. 4A and 4B are views comparing the power outputs of a conventional short-distance wireless communication module and a short-distance wireless communication module according to the present invention when the mobile terminal moves along a path illustrated in FIG. 3.
Figure 4B:
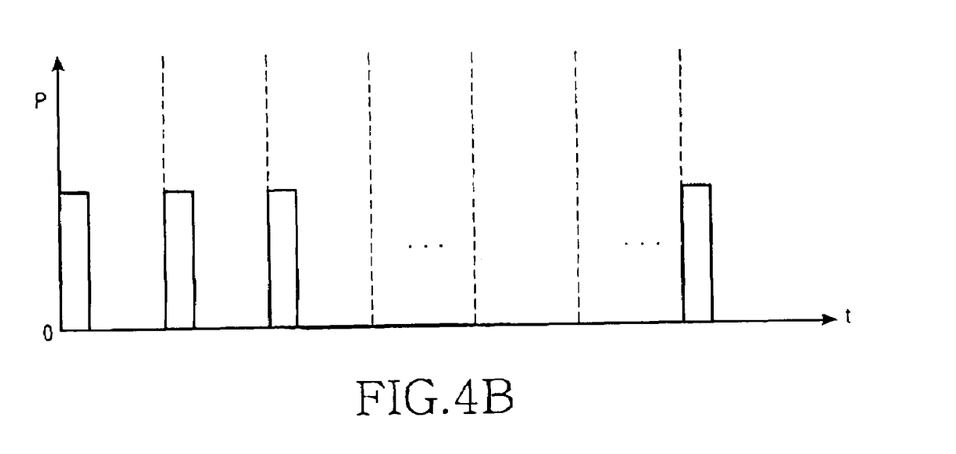

FIGS. 4A and 4B are views comparing the power outputs of a conventional short-distance wireless communication module and the inventive short-distance wireless communication module when the mobile terminal 80 moves in the path illustrated in FIG. 3. In FIGS. 4A and 4B, a horizontal axis represents time t and a vertical axis represents power output P.

Referring to FIG. 4A, the conventional short-distance wireless communication module 82 attempts a connection to the AP 300 continuously with predetermined power at a predetermined time irrespective of whether the mobile terminal 80 is at a position where a short-distance wireless communication is available. That is, while the mobile terminal 80 moves across the network 240 with SID and NID 3, the network 260 with SID 1 and NID 5, and the network 270 with SID 1 and NID 6, it attempts to be connected to the AP 300 every predetermined period, leading to unnecessary current consumption.

Referring to FIG. 4B, the short-distance wireless communication module 82 according to the present invention emits power P required to attempt a connection to the AP 300 only in the network 240 with SID 1 and NID 3. It does not emit the power P in areas other than the network 240. Therefore, the mobile terminal 80 can automatically be connected to the AP 300 with reduced current consumption.

Figure 5:
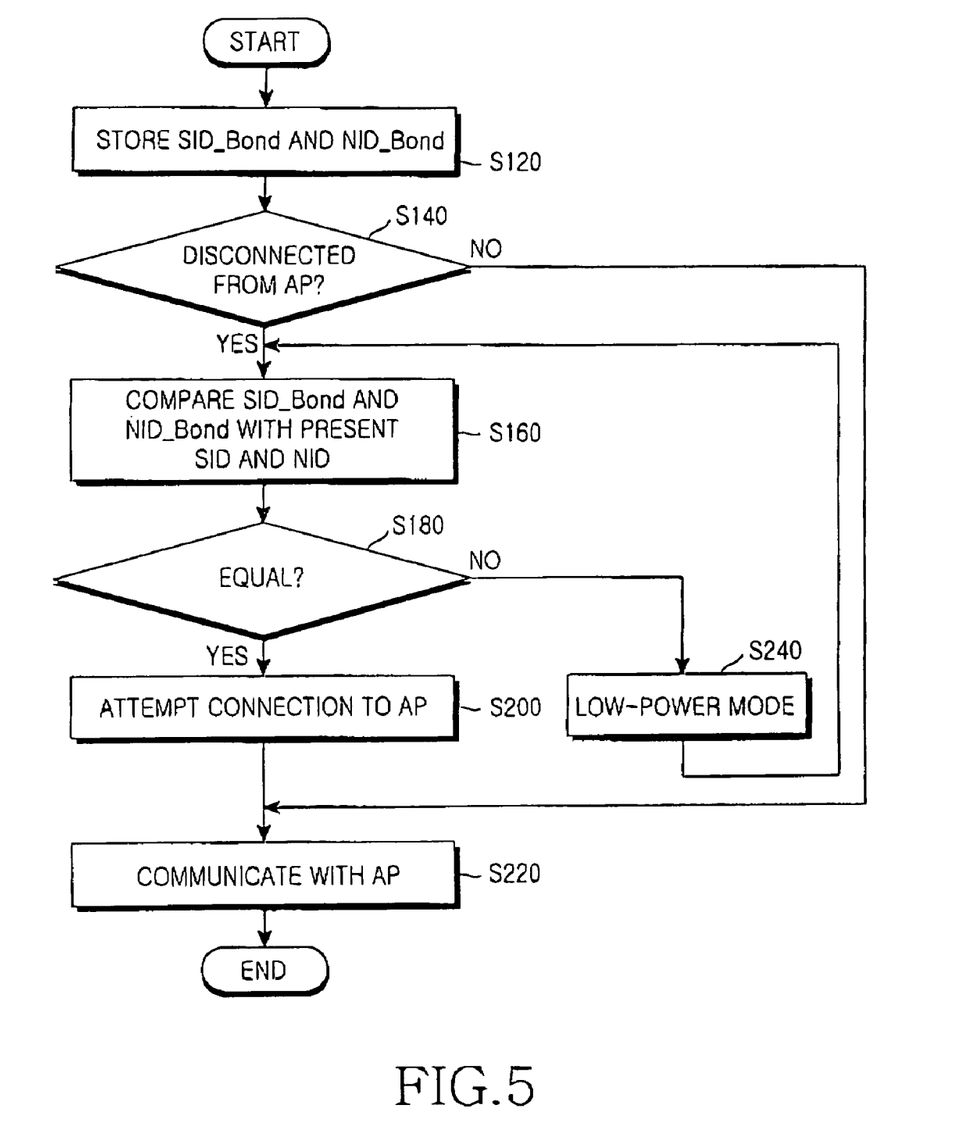
FIG. 5 is a flowchart illustrating a method of making a communication connection between the mobile terminal and a Bluetooth AP, minimizing current consumption according to an embodiment of the present invention.

FIG. 5 is a flowchart illustrating a method of automatically making a communication connection between the Bluetooth-enabled mobile terminal and the Bluetooth AP, minimizing the current consumption of the mobile terminal according to the present invention. Referring to FIG. 5, the mobile communication module 88 of the mobile terminal 80 receives the SID and the NID of the network 240 in which the AP 300 is positioned and stores them as SID_Bond and NID_Bond when the short-distance wireless communication module 82 is bonded with the initial AP 300 in step S120. In the embodiment of the present invention, SID_Bond and NID_Bond are SID 1 and NID 3, respectively by way of example. The bonding is a well-known technology disclosed in detail in "Bluetooth Specification Version 1.1 Generic Access Profile", pp. 43-44. Therefore, the bonding procedure itself will not be described here. Notably in the present invention, the mobile terminal 80 additionally stores the SID and the NID received during the bonding for use in locating the AP 300, as described above.

In step S140, the mobile communication module 88 determines whether a channel established between the short-distance communication module 82 and the AP 300 has been disconnected. If the communication is terminated between them, the mobile communication module 88 compares the SID_Bond and the NID_Bond with the SID and NID of a network in which the mobile terminal 80 is currently positioned in step S160.

If they are equal (match), the short-distance wireless communication module 82 attempts a connection to the AP 300 in step S200. In step S220, the short-distance wireless communication module 82 communicates with the AP 300.

However, if the communication channel is maintained in step S140, the short-distance wireless communication module 82 keeps communicating with the AP 300 on the existing channel in step S220.

If the SID_Bond and the NID_Bond are different from the present SID and NID in step S180, the short-distance wireless communication module 82 is transitioned to a lower-power mode in step S240. Alternatively, the short-distance wireless communication module 82 may also be turned off in step S240.

With the short-distance wireless communication module 82 in the low-power mode or the power-off mode, the mobile communication module 88 performs steps S160 and S180. That is, the mobile communication module 88 compares the SID_Bond and the NID_Bond with the SID and NID of the present network, while the short-distance wireless communication module 82 is in the low-power mode or power-off mode. If they are equal, the short-distance wireless communication module 82 attempts a communication connection to the AP 300 with predetermined power every predetermined period. However, if the SID_Bond and the NID_Bond are different from the present SID and NID, the mobile communication module 88 maintains the short-distance wireless communication module 82 in the current mode (i.e. lower-power or power-off mode).

In accordance with the present invention as described above, an SID and an NID for use in locating a mobile terminal is stored at an initial bonding and compared with an SID and an NID received at the present position. According to the comparison result, an AP communication available area is detected and it is determined whether the mobile terminal can communicate with an AP. Thus, beyond the AP communication available area, a short-distance wireless communication module is transitioned to a low-power mode or a power-off mode, thereby minimizing current consumption.

Furthermore, a connection to the AP is attempted only when the stored SID and NID are equal to the present SID and NID. If they are different, modules related with short-distance wireless communication including the short-distance wireless communication module are transitioned to the low-power mode or power-off mode. Consequently, power consumption is minimized, still conducting a necessary communication with the AP.

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of connecting a mobile terminal and an access point (AP), the mobile terminal including a short-distance wireless communication module and a mobile communication module, and the AP providing a wired/wireless communication interface, the method comprising the steps of:
   (a) storing cell identification (ID) information of a network in which the AP is located when the mobile terminal is initially bonded with the AP;
   (b) determining whether a channel between the AP and the short-distance wireless communication module is terminated;
   (c) detecting present cell ID information of a network in which the mobile terminal is currently positioned;
   (d) comparing the stored cell ID information with the present cell ID information, if the channel is terminated; and
   (e) transitioning the short-distance wireless communication module to a low-power mode if the stored cell ID information is different from the present cell ID information.

2. The method of claim 1, further comprising the step of transitioning the short-distance wireless communication module to a power-off mode if the stored cell ID information is different from the present cell ID information.

3. The method of claim 2, further comprising the step of attempting to connect to the AP by the short-distance wireless communication module if the stored cell ID information is identical to the present cell ID information.

4. The method of claim 2, further comprising the steps of:
   detecting new present cell ID information for a new present position and comparing the stored cell ID information with the new present cell ID information by the mobile communication module, while the short-distance wireless communication module is in one of the low-power mode and the power-off mode; and
   attempting to reconnect by the short-distance wireless communication module to the AP if the stored cell ID information is identical to the new present cell ID information.

5. The method of claim 4, further comprising the step of maintaining the short-distance wireless communication module in one of the low-power mode and the power-off mode if the stored cell ID information is different from the new present cell ID information.

6. The method of claim 4, further comprising the step of communicating with the AP on the channel if the short-distance wireless communication module is one of not disconnected to the AP in step (b) and is reconnected to the AP.

7. The method of claim 1, wherein the short-distance wireless communication module is a Bluetooth module, and the AP is a Bluetooth AP connected wirelessly to the Bluetooth module, for providing a wired/wireless interface to the Bluetooth module.

8. The method of claim 1, wherein the cell ID information is a system ID (SID) and network ID (NID) that identify a cell in a cellular network.

9. The method of claim 8, wherein the stored cell ID information is SID_Bond and NID_Bond.

* * * * *

UNITED STATES PATENT AND TRADEMARK OFFICE
CERTIFICATE OF CORRECTION

PATENT NO.        : 7,606,600 B2
APPLICATION NO. : 10/858302
DATED             : October 20, 2009
INVENTOR(S)       : Joung-Kyou Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Twelfth Day of October, 2010

David J. Kappos
*Director of the United States Patent and Trademark Office*